United States Patent [19]
Carle et al.

[11] Patent Number: 5,847,321
[45] Date of Patent: Dec. 8, 1998

[54] BUSBAR DEVICE FOR AN ELECTRICAL DISTRIBUTION CABINET

[75] Inventors: Pierre Carle, St. Pierre D'Albigny; Philippe Gerbier, St. Ismier; Pierre Vigne-Salade, St. Martin D'Heres, all of France

[73] Assignee: Schneider Electric SA, France

[21] Appl. No.: 429,849

[22] Filed: Apr. 27, 1995

[30] Foreign Application Priority Data

May 6, 1994 [FR] France .................................. 94 05865

[51] Int. Cl.⁶ .................................................. H02G 5/04
[52] U.S. Cl. ................... 174/99 B; 174/68.2; 174/70 B; 174/149 B
[58] Field of Search ................... 174/99 B, 68.2, 174/70 B, 149 B, 72 B, 71 B, 88 B; 361/673, 634, 637, 648

[56] References Cited

U.S. PATENT DOCUMENTS 3,538,390  11/1970  Yorgin et al. ............................ 361/673

FOREIGN PATENT DOCUMENTS

| 0589775 | 3/1994 | European Pat. Off. . | |
|---|---|---|---|
| 1206361 | 2/1960 | France | 174/99 B |
| 2515856 | 5/1983 | France . | |
| 1041129 | 10/1958 | Germany . | |
| 1273657 | 7/1968 | Germany | 174/72 B |
| 7709147 | 7/1977 | Germany . | |
| 0011560 | of 1895 | United Kingdom | 174/99 B |

*Primary Examiner*—Hyung S. Sough
*Attorney, Agent, or Firm*—Parkhurst & Wendel

[57] ABSTRACT

A busbar device with an insulating support block with two assemblable fixing parts bounding internal housings to receive multipole current conductors, each housing being formed by a semi-open recess. The bottoms of the recesses are located in distinct planes extending in a parallel manner along the longitudinal direction of the profiled sections, and separated from one another by a predetermined transverse pitch, and the profiled sections of the current conductors are staggered at regular intervals in the extension direction of the assembly interface of the fixing parts to form a stepped structure.

11 Claims, 11 Drawing Sheets

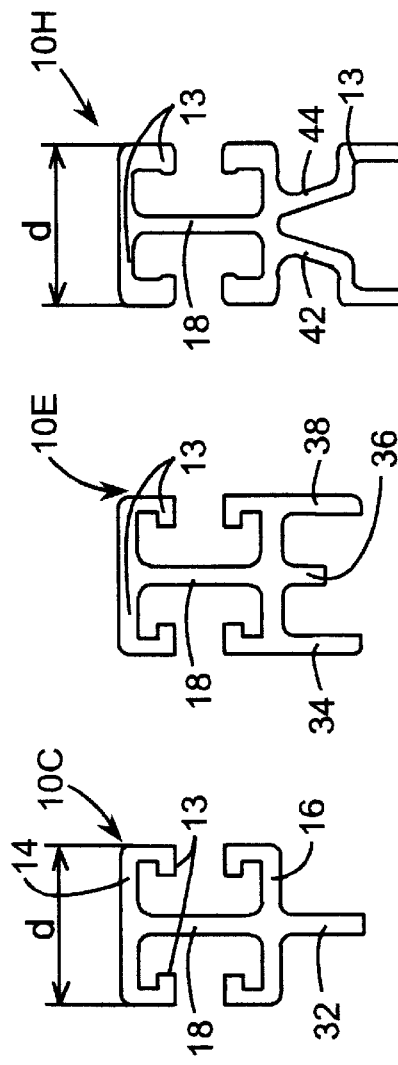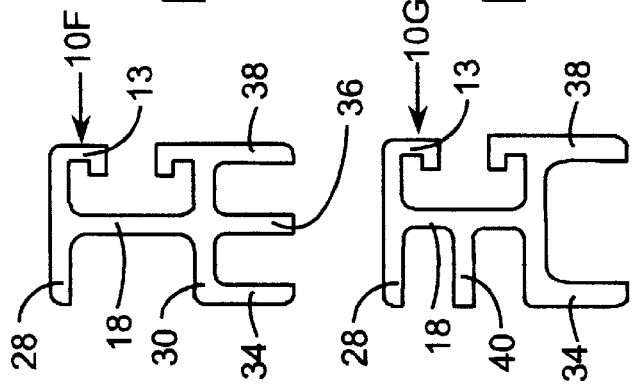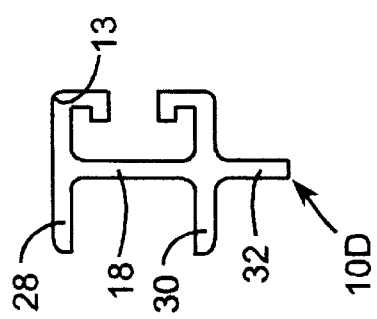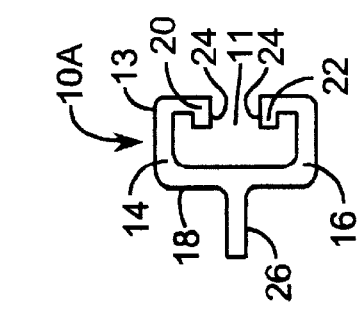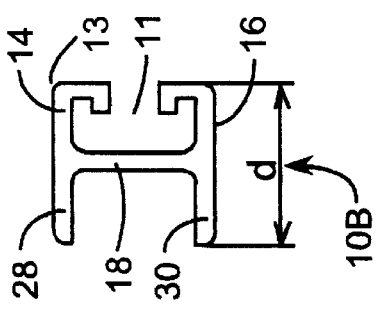

BUSBAR DEVICE FOR AN ELECTRICAL DISTRIBUTION CABINET

BACKGROUND OF THE INVENTION

The present invention relates to a busbar device for an electrical power supply and/or distribution installation, comprising current conductors formed by elongated profiled sections made from a good electrical conducting material, notably copper or aluminium based, at least one insulating support block composed of a first fixing part coming into engagement with a second fixing part to constitute a plurality of individual housings to receive each current conductor, said insulating support extending perpendicularly with respect to the longitudinal direction of the profiled sections, semi-open recesses made in the first and/or second fixing part on the assembly interface side to bound said housings, and assembly means to perform tightening of the two fixing and assembly means to perform tightening of the two fixing parts against one another at the level of said interface.

It is already known from the document DE-A-3,143,518 to use a set of insertable shims to receive conductors of different dimensions in the same insulating support. The use of these shims enables width and height adjustment according to the specific cross-section of the bars.

The document DE-GM 7,709,147 also shows flat conducting bars inserted in housings of a support with shims fitted in the bottom of the recesses. The depth of the recesses corresponds to a multiple of the thickness of each bar.

The lesson to be drawn from this prior art is that all the current conductors are located in a single plane at the level of the assembly interface of the two fixing parts of the insulating support. It is then indispensable to deform the electrical switchgear connecting conductors, to avoid any contact with a bar of a different phase, which complicates installation of the electrical cabinet.

SUMMARY OF THE INVENTION

The object of the invention is to improve the electrical connection of the switchgear with the power supply or distribution busbar of a cabinet.

The busbar device according to the invention is characterized in that the bottoms of the recesses are located in distinct planes extending in a parallel manner along the longitudinal direction of the profiled sections, and separated from one another by a preset transverse pitch, and that the profiled sections of the current conductors are staggered at regular intervals in the extension direction of the assembly interface of the fixing parts to form a stepped structure.

The presence of the transverse stagger of the current conductors allows access from the front to connect the connecting conductors to the contact faces of the busbar conductors. The connecting conductors can be straight and do not require any deformation, due to the fact that the different contact faces are located in different planes.

BRIEF DESCRIPTION OF THE DRAWINGS

Other advantages and features of the invention will become more clearly apparent from the following description of an embodiment of the invention, given as a non-restrictive example only and represented in the accompanying drawings in which:

FIGS. 1 to 8 show different shapes of profiled sections used as current conductors of the busbar;

DETAILED DESCRIPTION OF THE PREFERRED EMBODIMENT

Figure 9:
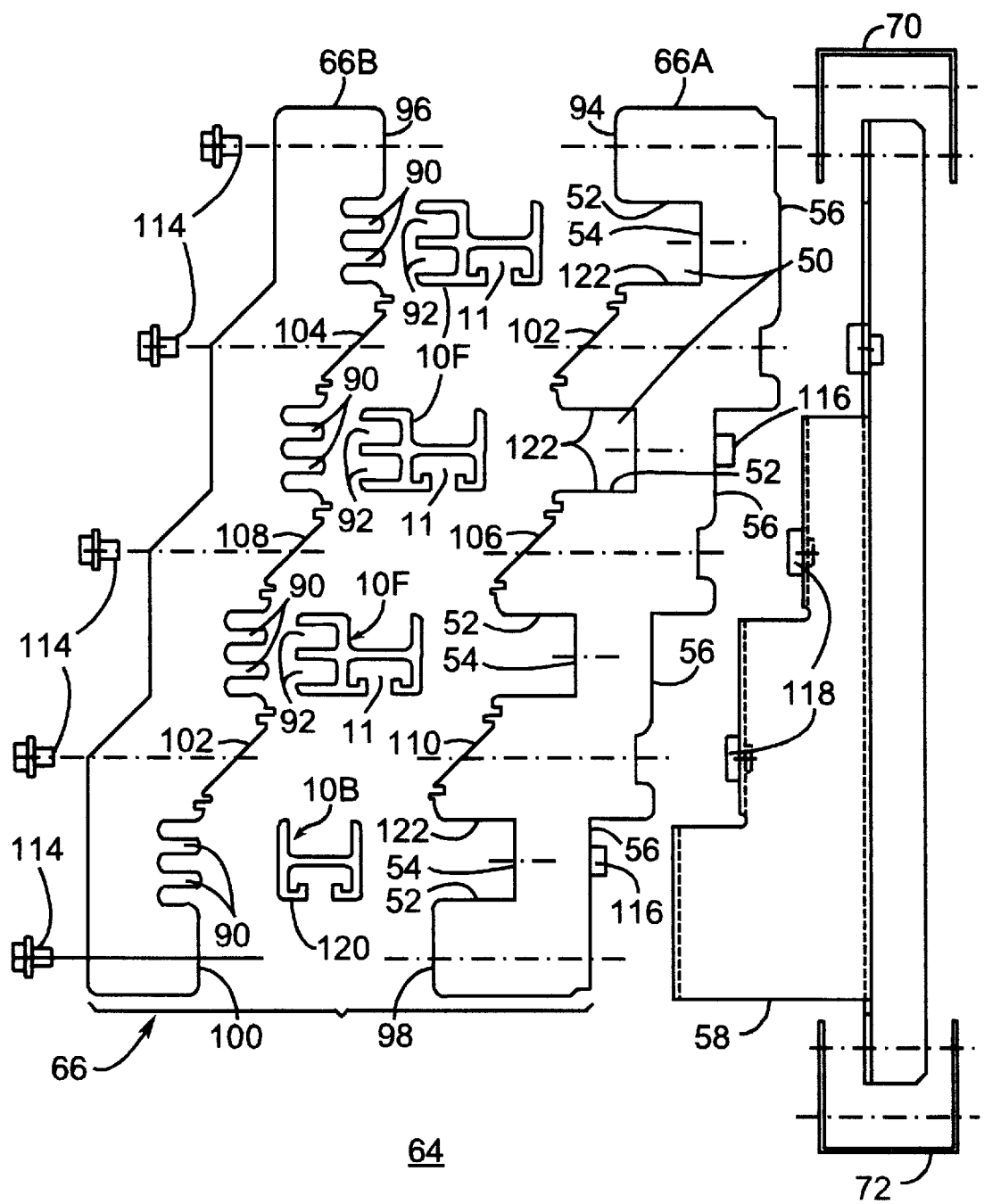
FIG. 9 represents an exploded schematic plane view of the busbar according to the invention.

According to FIGS. 1 to 8, the current conductors are formed by profiled sections of different cross-sections, and made from a good electricity conducting material notably copper or aluminium. These conductors can be used in a multipole busbar of a low voltage electrical distribution installation, which will be described hereafter with reference to FIGS. 12 and 14.

In FIG. 1, the profiled section of the current conductor 10A has a C-shaped cross-section comprising a longitudinal groove 11 associated to a parallel first and second wing 14, 16, which are joined to a common branch 18. The central groove 11 is arranged between two respective protrusions 20, 22 of the wings 14, 16, each protrusion 20, 22 being shaped as a hook having a straight edge 24 extending parallel to the wings 14, 16. The width of the groove 11 measured between the edges 24 of the protrusions 20, 22 is smaller than the distance separating the two parallel wings 14, 16. The internal space of the profiled section forms a semi-open recess 13, which is accessed at the level of the groove 11. The common branch 18 bears a central flange 26, arranged on the side external to the groove 11.

According to the alternative embodiment of FIG. 2, the current conductor 10B has a similar structure to that of the conductor 10A of FIG. 1, but the branch 18 is provided with two flanges 28, 30 arranged respectively in the extension of the wings 14, 16.

In FIG. 3, the profiled section of the conductor 10C comprises two identical notches 13, arranged symmetrically back to back at the level of the common branch 18. A flange 32 extends in the extension of the branch 18 and perpendicularly to the wing 16. The conductor can also be achieved without the flange 32.

The structure of the conductor 10D of FIG. 4 is similar to that of FIG. 2, with an additional flange 32 in the extension of the common branch 18.

The conductor 10E of FIG. 5 is similar to that of FIG. 3, with three parallel flanges 34, 36, 38 facing downwards. The central flange 36 is located in the extension of the branch 18 and is shorter than the other two adjacent flanges 34, 38. The profiled section 10F of FIG. 6 corresponds to that of FIG. 4 but with three lower flanges 34, 36, 38 of the same lengths.

The current conductor 10G of FIG. 7 is equipped with two horizontal flanges 28, 40 and two vertical flanges 34, 38. All of the current conductors 10C to 10G illustrated in FIGS. 3 to 7 present profiled sections of the same dimensions 30×45 mm.

In FIG. 8, the profiled section of the conductor 10H is provided with three C-shaped notches 13, the two upper ones of which are adjoined to one another by the branch 18. The junction with the third lower notch 13 is achieved by means of inclined flanges 42, 44. The dimensions of the conductor 10H correspond to 30×60 mm.

The distance d corresponding to a width of 30 mm is identical for all the profiled sections of the conductors 10A to 10H. The height of 30 mm is also the same for the first series of two conductors 10A and 10B. It is 45 mm for all the conductors 10C to 10G of the second series, and reaches 60 mm for the last conductor 10H. The heightwise pitch variation is 15 mm from one series to the other.

The flanges of the different current conductors 10A to 10H form an integral part of the profiled sections and have the current flowing through them. This results in a double function of electrical conduction and thermal dissipation by means of a profiled section manufactured in a single part.

Figure 10:
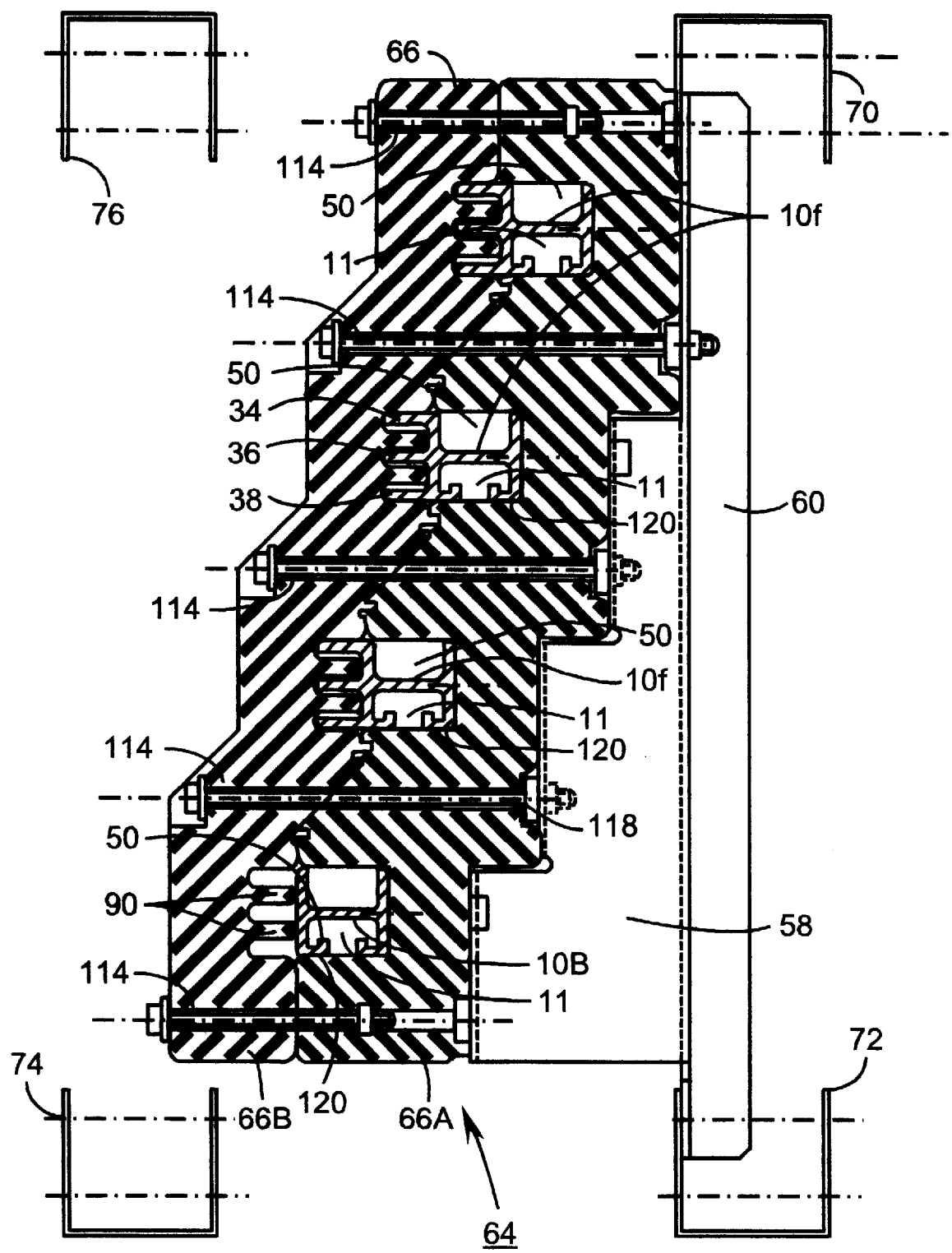
FIG. 10 is a cross-sectional view along the line 10—10 of FIG. 12.

With reference to FIGS. 9 and 10, each type of current conductors 10A to 10H, represented in FIGS. 1 to 8, can be inserted in at least one insulating support block 66, 68 to constitute a multipole busbar device 64. The choice of the type of conductor is made according to the current rating of the electrical cabinet. Typically, the conductors 10A to 10B of FIGS. 1 and 2 are used for low ratings, those 10C to 10G of FIGS. 3 to 7 for medium ratings, and the conductor 10H of FIG. 8 for high ratings.

In FIG. 9, the insulating support block 66 comprises two fixing parts 66A, 66B designed to be assembled against one another to form housings 50 receiving the current conductors 10F and 10B. The first fixing part 66A comprises a succession of square-shaped semi-open recesses 52, each side of which is slightly larger than the distance d. The current conductor 10A or 10B of FIGS. 1 and 2 can be totally inserted inside each recess 52.

The respective bottoms 54 of the different recesses 52 are located in distinct planes extending parallel to the longitudinal direction of the profiled sections, and separated from one another by regular intervals.

Figure 12:
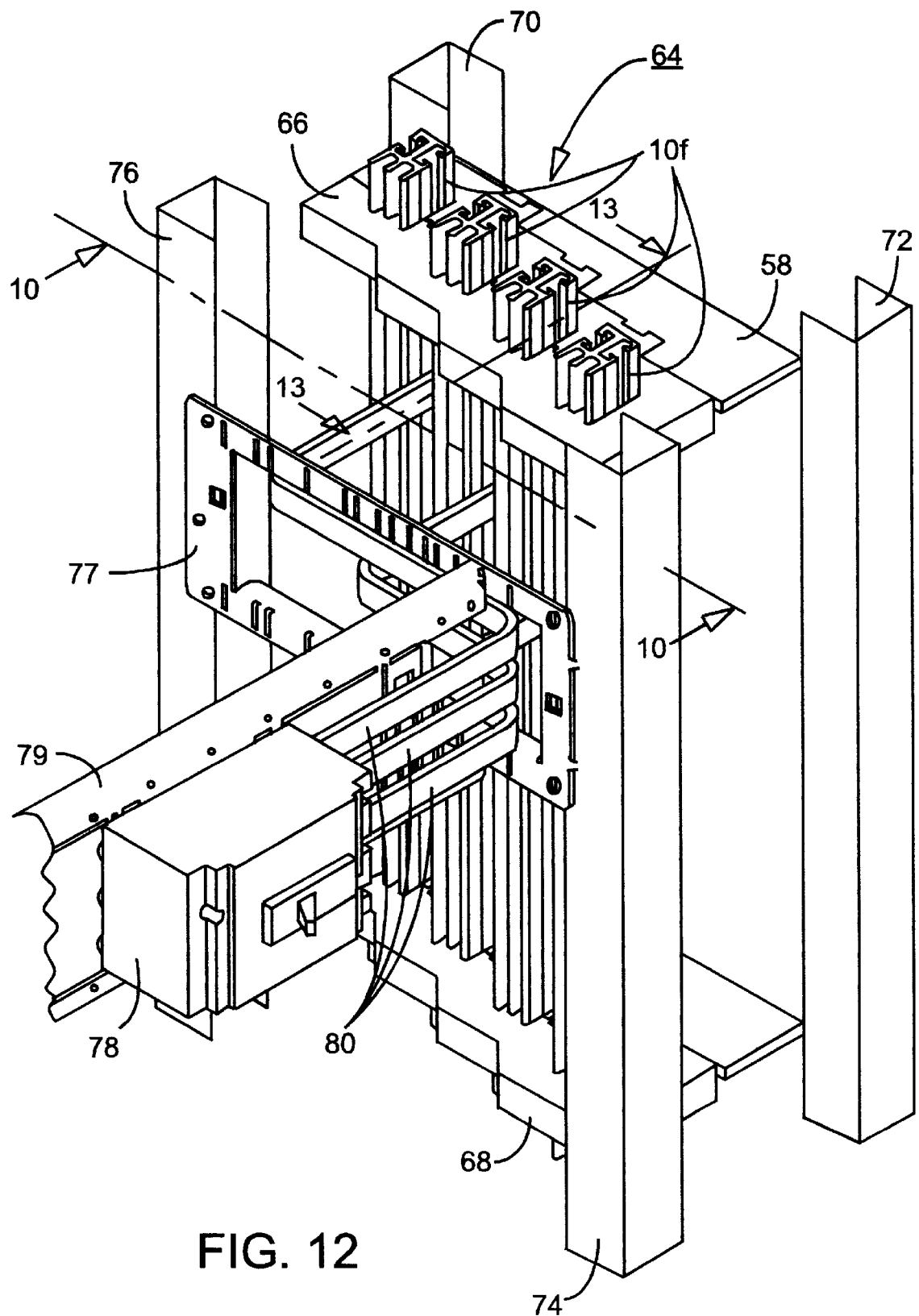
FIG. 12 is a perspective view of the multipole busbar according to the invention.

The first fixing part 66A is in addition equipped with a plurality of bearing faces 56 situated opposite the respective recesses 52 in parallel planes separated from one another by regular intervals, whose dimensions correspond to those of the bottoms 54. The different bearing faces 56 of the part 66A form a stepped structure designed to be securedly affixed to conjugate faces of a metallic auxiliary support 58. The latter is equipped with a straight spacer 60 fixed to two coplanar uprights 70, 72 of the frame. The other two opposite uprights 74, 76 serve the purpose of fixing the support spacer 77 of the mounting plate 79 (FIG. 12).

The second fixing part 66B is provided with a succession of positioning studs 90 constituting a rake structure, designed to cooperate with the current conductors 10F and 10B to enable assembly of the insulating support 66 independently from the type of current conductors. The lower studs 90 come directly into contact against the external surface of the fins or flanges of the conductor 10B at the level of the lower housing 50. In the three upper housings 50, the positioning studs 90 engage inside grooves 92 arranged between the flanges 34, 36, 38. In the embodiment of FIGS. 9 and 10, the studs 90 are moulded with the second fixing part 66B.

Each fixing part 66A, 66B (FIG. 9) is in addition equipped with a first pair of joining faces 94, 96 to the upper part, with a second pair of joining faces 98, 100 to the lower part, and with three pairs of intermediate joining faces 102, 104; 106, 108; 110, 112. The joining faces of each pair come into contact with one another when assembly of the two fixing parts 66A, 66B is performed by means of screws 114 passing through aligned orifices made in the insulating body of the two adjoined parts 66A, 66B.

At least one bearing face 56 of the first fixing part 66A is provided with a latching spur 116 cooperating with the metallic support 58 to perform centering of the screws 114 with respect to nuts 118 securedly affixed to the support 58.

In the assembled position of the support block 66, the respective joining faces 94, 96; 98, 100 of the first and second pairs are in planes parallel to the longitudinal direction, whereas the other faces 102, 104; 106, 108; 110, 112 are located two by two in three parallel planes inclined with respect to the same longitudinal direction.

In FIG. 10, it is apparent that the transverse stagger of the grooves 11 arranged facing the contact faces 120 of the different conductors 10F and 10B has a regular pitch, for example 22 millimeters. Such a transverse stagger of the current conductors 10F and 10B allows access from the front to each groove 11 for connection of the prefabricated connecting conductors 80 of the electrical switchgear 78 fixed onto the mounting plate 79 (see FIG. 12).

With reference to FIG. 9, the side walls on each side of the bottom 54 of each recess 52 of the first fixing part 66A comprise at least one protuberance 122 in the middle zone to form a hangup point holding the current conductor inside the housing 50.

Figure 11:
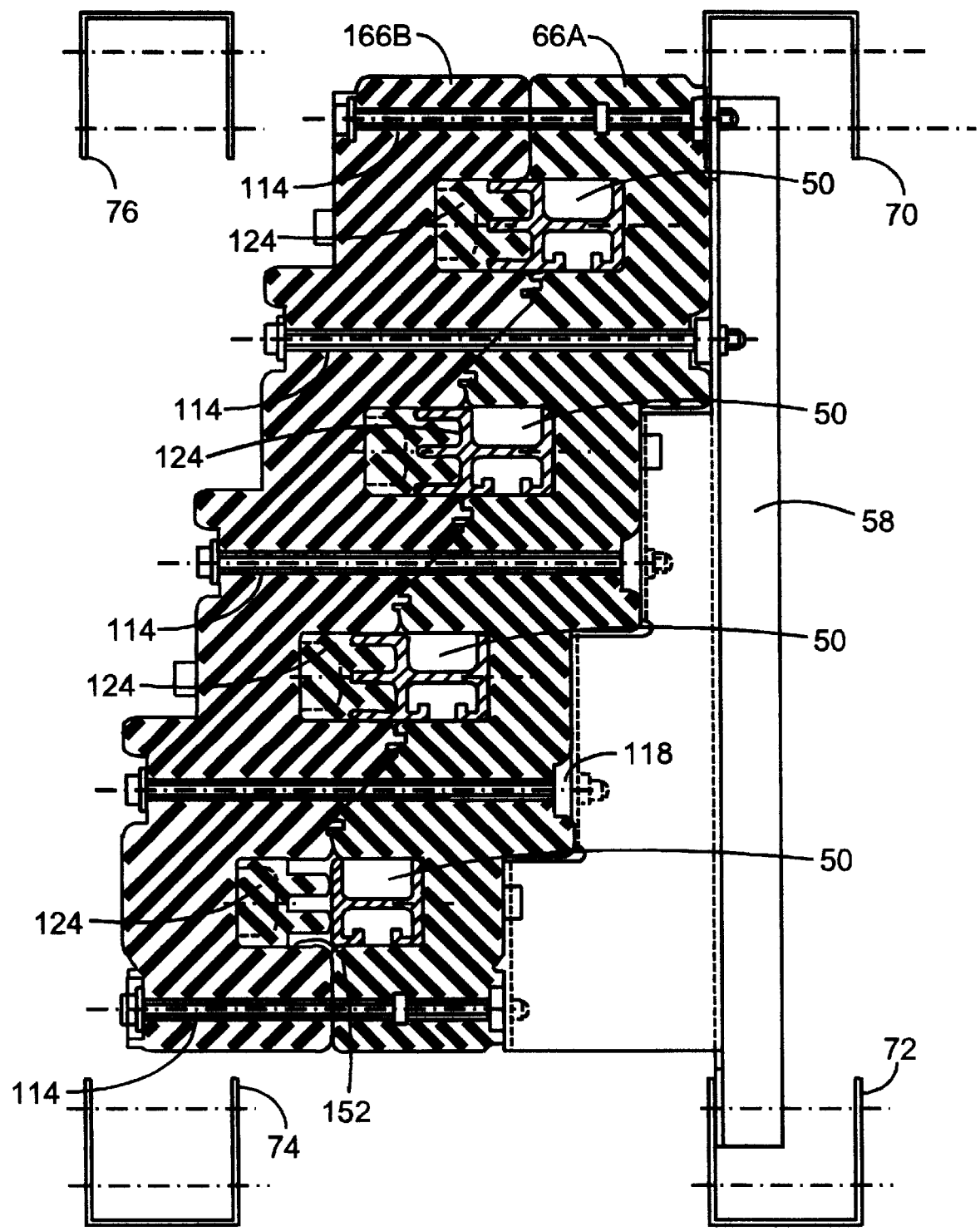
FIG. 11 is an identical view to FIG. 10 of an alternative embodiment.

In the embodiment of FIG. 11, the structure of the second fixing part 166B is identical to that of the first part 66A, with an arrangement reversed 180 degrees when the assembly phase takes place. The positioning studs are arranged on removable wedging shims 124 able to be fitted in the recesses 152 of the second fixing part 166B. Fitting of the wedging shims 124 in the recesses 152 is compulsory when the current conductors 10A to 10G are used. The wedging shims 124 simply have to be removed when the conductor 10H of FIG. 8 is used.

Figure 13:
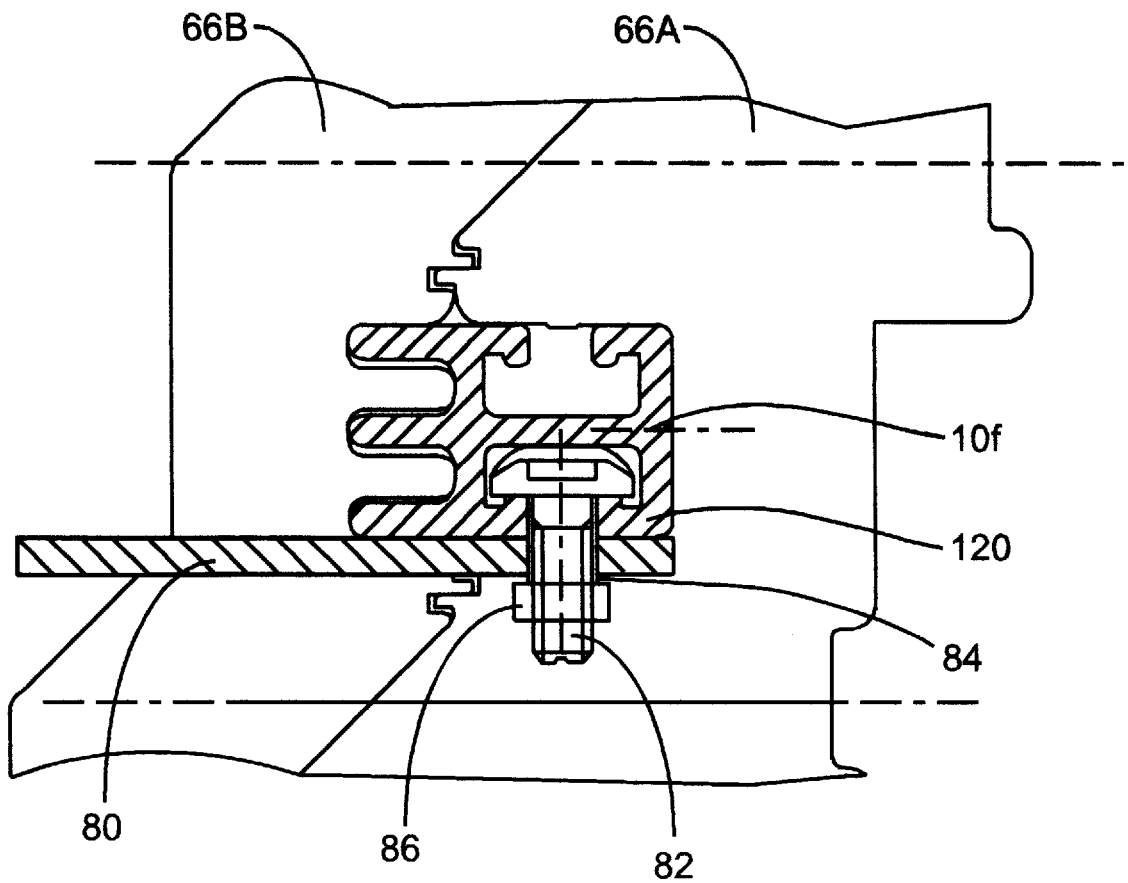
FIG. 13 is a cross-sectional view along the line 13—13 of FIG. 12.

FIG. 13 shows the connection device at the level of a current conductor 10F. The connection device comprises a fixing screw 82 whose head is housed captive inside the recess 13 of the profiled section. The threaded body of the screw 82 extends through the groove 11 towards the outside of the profiled section, passing through a hole 84 arranged at the end of the connecting conductor 80. A nut 86, accessible from outside, cooperates with the screw 82 to tighten the conductor 80 against the contact face 120 of the profiled section.

Figure 14:
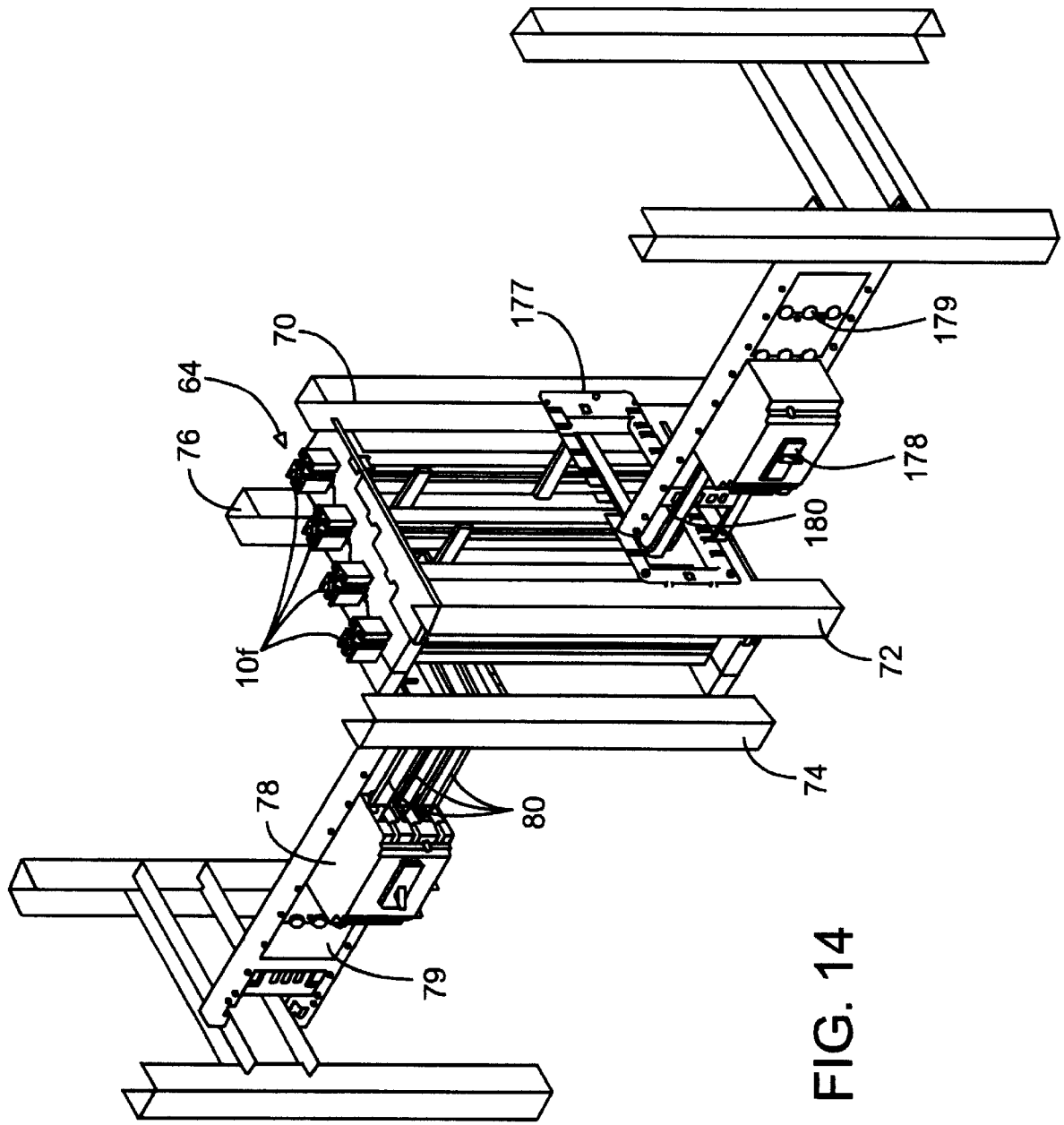
FIG. 14 is a perspective view of an installation with symmetrical double rows.

With reference to FIG. 14, the left-hand part corresponds to the architecture of FIG. 12, associated to the multipole busbar 64 with vertical disposition. It is possible to add other rows of mounting plates on the right-hand side, one of which mounting plates is represented by the reference 179, fixed to the uprights 70, 72 by a reversible second spacer 177. This results in two electrical switchgear units 78, 178 being able to be mounted face to face while guaranteeing access to the connections from the front by means of a single intercalated busbar 64.

The bushings of the connecting conductors 80, 180 can be sealed off at the level of the spacers 77, 177 so as to partition the lateral compartments of the switchgear with respect to that of the busbar 64.

Figure 15:
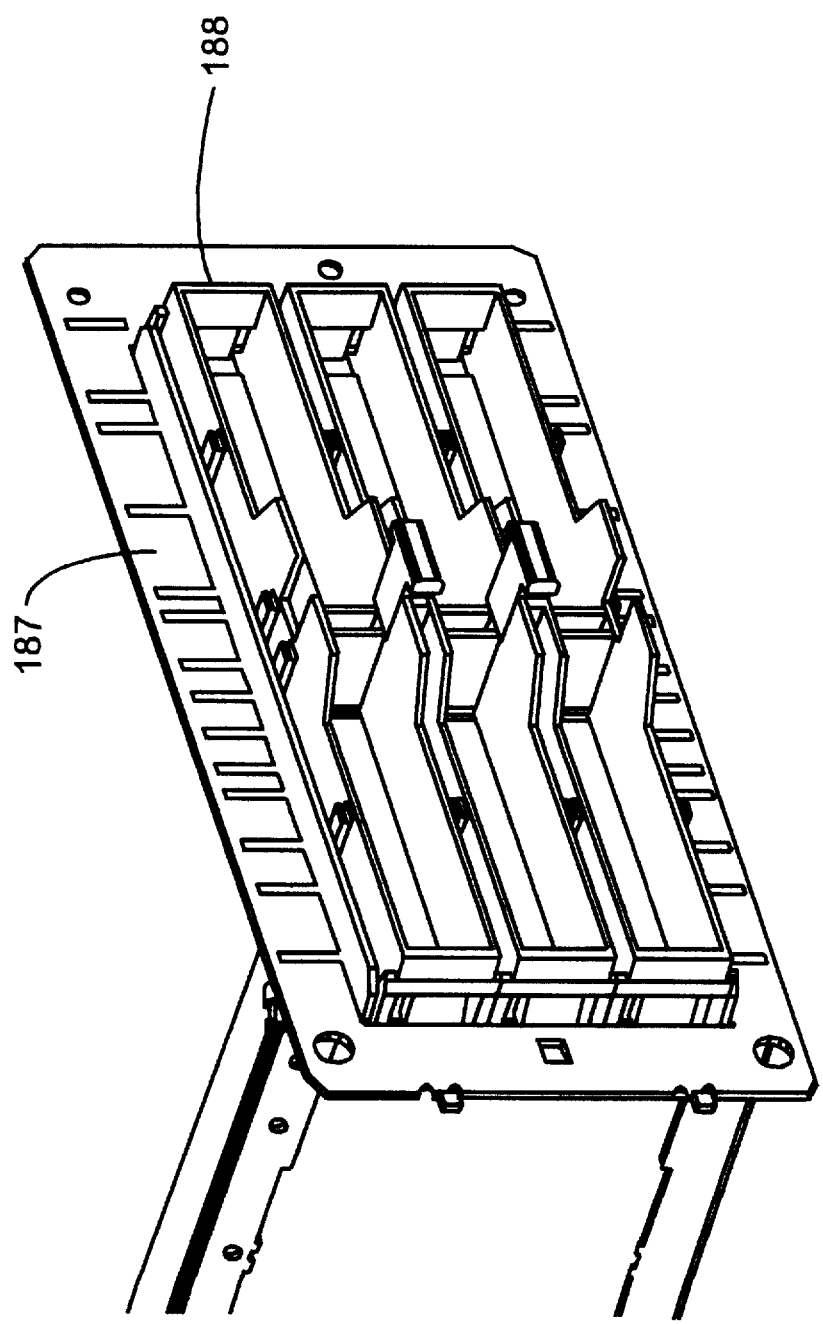
FIG. 15 and 16 show respectively, a perspective and plan view of a spacer for separating the busbar from the electrical switchgear compartment.
Figure 16:
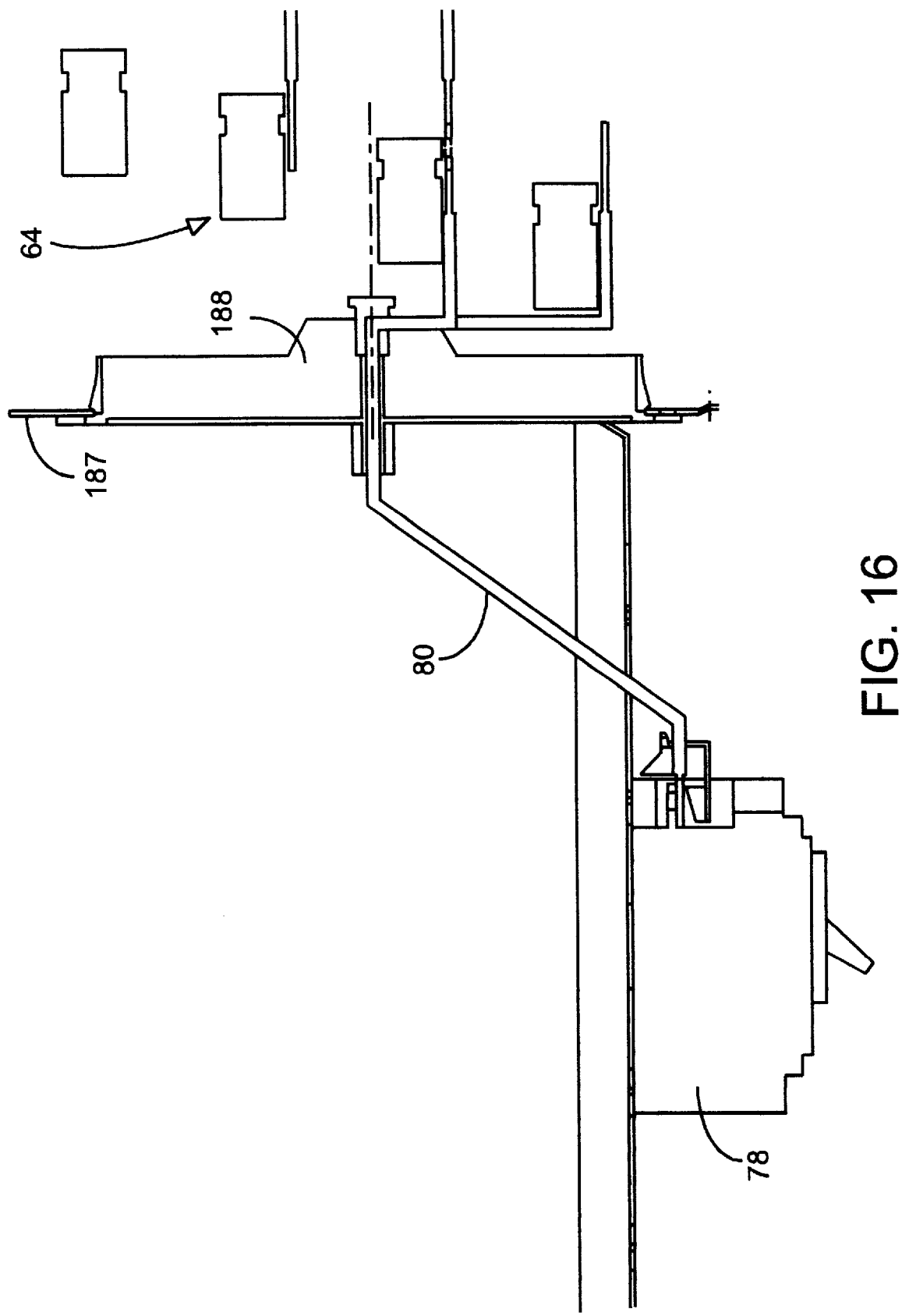

An example of a tightly sealed bushing is represented on the spacer 187 of FIG. 15 and 16, enabling a built-in connection unit to be obtained, for example for a 250A rating.

The center part of the spacer 187 comprises an insulating case 188 with single-pole elements through which insulated flexible conductors 80 pass at the level of each phase for connection of the switchgear 78 to the busbar 64.

Figure 17:
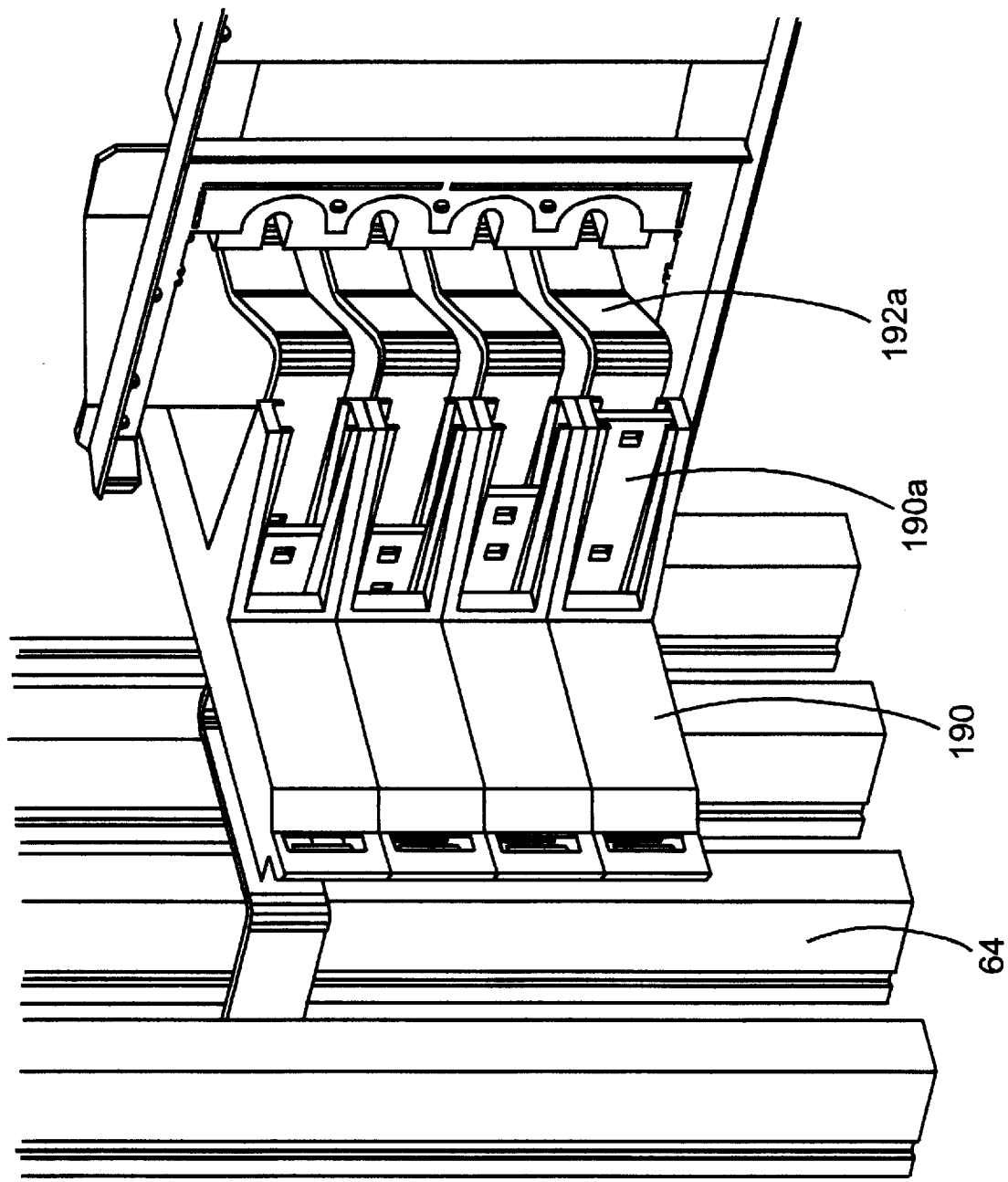
FIGS. 17 and 18 are identical views to FIGS. 15 and 16 of an alternative embodiment.
Figure 18:
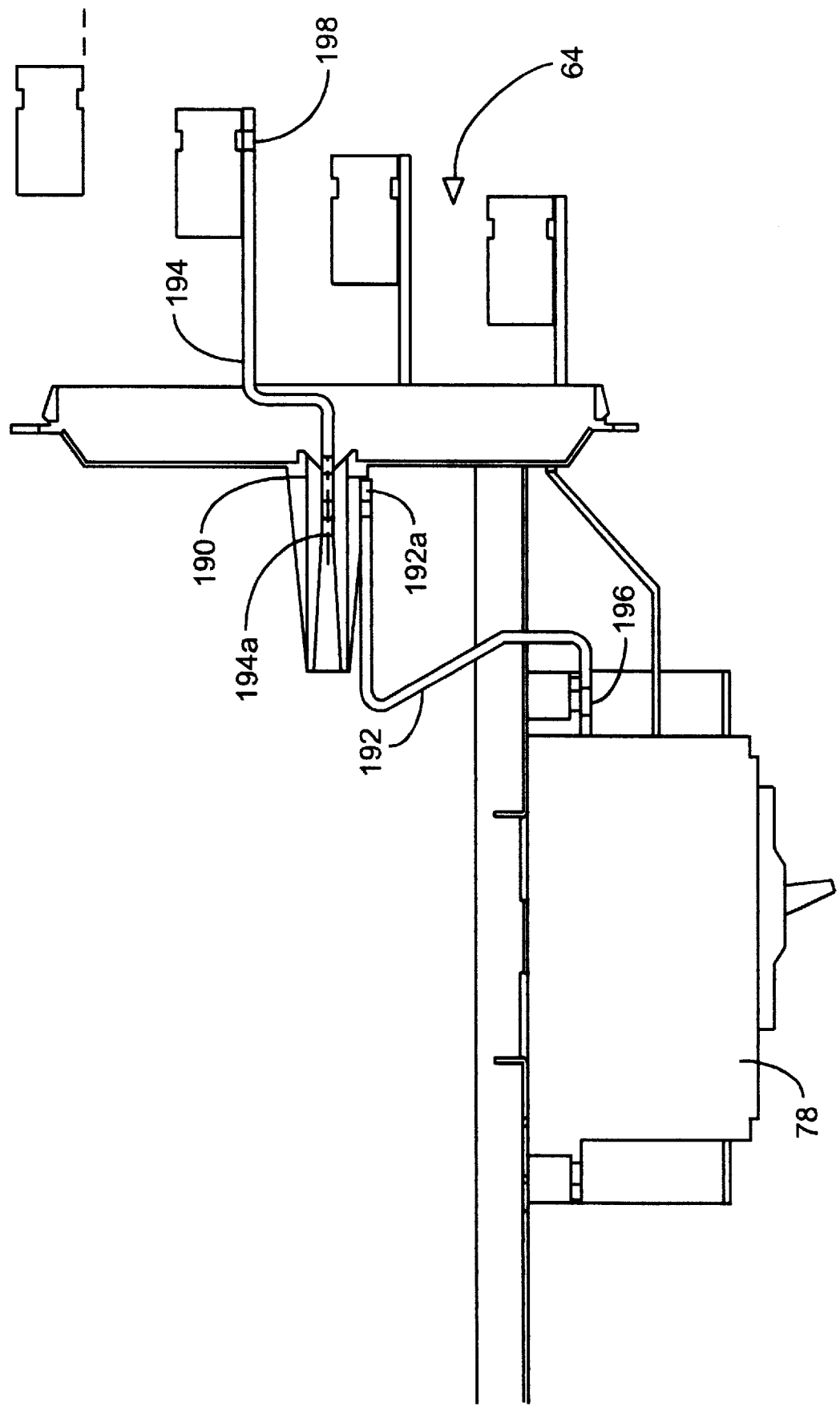

According to the alternative embodiment represented in FIGS. 17 and 18, applied to an electrical switchboard having a rating of 450A–630A, the spacer 187 is also equipped with an insulating case 190 with single-pole elements. Electrical connection of the switchgear 78 to the busbar 64 is performed at the level of each phase by two elementary conductors 192, 194 shaped as bare rigid bars, connected respectively to the switchgear device 78 at the point 196, and to the corresponding bar at the point 198. At the level of the case 190, the ends 192a and 194a of the conductors are arranged facing one another, and assembled to one another by means of fixing parts.

We claim:

1. A busbar device for an electrical power supply and/or distribution installation, comprising:

current conductors formed by elongated profiled sections comprising electrically conducting material and having a C-shaped cross-sectional portion;

at least one insulating support block comprising a first fixing part engaged with a second fixing part at an assembly interface to constitute a plurality of individual housings each to receive an individual current conductor, said insulating support block extending perpendicularly with respect to a longitudinal direction of the profiled sections;

semi-open recesses formed in one of at least the first and second fixing parts to bound said housings, said recesses having bottoms located in distinct planes extending in a parallel manner along the longitudinal direction of the profiled sections, and separated from one another by a preset transverse pitch, said profiled sections being staggered at regular intervals with respect to the assembly interface to form a stepped structure; and assembly means for tightening the first and second fixing parts against one another at the assembly interface, wherein said C-shaped cross-sectional portion comprises a flat contact face to which a connecting conductor is connected outside the insulating support block, connection being made in a predetermined longitudinal position by means of a connecting device having a bolt and nut accessible from outside, each contact face being arranged in a plane parallel to a direction of the transverse pitch, and staggered transversely by the transverse pitch, and along the assembly interface by said intervals, wherein the current conductors further comprise a U-shaped cross-sectional portion extending opposite to an open area of the C-shaped cross-sectional portion, and wherein the width of each recess, measured from the contact face in the direction of the assembly interface, corresponds to the width of the current conductors.

2. The busbar device according to claim 1, wherein each recess in the first fixing part is square-shaped.

3. The busbar device according to claim 1, wherein the second fixing part is equipped with positioning studs cooperating with the current conductors to wedge the current conductor 5 in the transverse direction.

4. The busbar device according to claim 3, wherein the positioning studs form an integral part of the second fixing part.

5. The busbar device according to claim 3, wherein the positioning studs are arranged on removable wedging means designed to be fitted in the recesses of the second fixing part.

6. The busbar device according to claim 1, wherein a side wall of each recess comprises a protuberance to constitute a part holding the current conductor inside the housing.

7. The busbar device according to claim 1, wherein the first fixing part comprises a plurality of bearing faces arranged in steps opposite the recesses to cooperate with conjugate faces of an auxiliary metallic support, which is fixed to a frame.

8. The busbar device according to claim 1, wherein the connecting conductors between a switchgear and busbar are arranged as a built-in connection unit, each conductor passing through an insulating case with single-pole elements separating a busbar compartment from that of the switchgear.

9. The busbar device of claim 1, wherein the good electrical conducting material comprises one of copper-based materials and aluminum-based materials.

10. A busbar device for an electrical power supply and/or distribution installation, comprising:

current conductors formed by elongated profiled sections comprising good electrical conducting material and having a C-shaped cross-sectional portion and a U-shaped cross-sectional portion extending opposite to the C-shaped cross-sectional portion and an E-shaped cross-sectional portion adjacent the U and C-shaped cross-sectional portions;

at least one insulating support block comprising a first fixing part engaged with a second fixing part at an assembly interface to constitute a plurality of individual housings to receive each current conductor, said insulating support block extending perpendicularly with respect to a longitudinal direction of the profiled sections;

semi-open recesses formed in one of at least the first and second fixing parts to bound said housings, said recesses having bottoms located in distinct planes extending in a parallel manner along the longitudinal direction of the profiled sections, and separated from one another by a preset transverse pitch, said profiled sections being staggered at regular intervals with respect to the assembly interface to form a stepped structure; and assembly means for tightening the first and second fixing parts against one another at the assembly interface, wherein said C-shaped cross-sectional portion comprises a flat contact face to which a connecting conductor is connected outside the insulating support block, connection being made in a predetermined longitudinal position by means of a connecting device having a bolt and nut accessible from outside, each contact face being arranged in a plane parallel to a direction of the transverse pitch, and staggered transversely by the transverse pitch, and along the assembly interface by said intervals, and wherein the width of each recess, measured from the contact face in the direction of the assembly interface, corresponds to the width of the current conductors.

11. A busbar device for an electrical power supply and/or distribution installation, comprising:

current conductors formed by elongated profiled sections comprising good electrical conducting material and having a C-shaped cross-sectional portion and a U-shaped cross-sectional portion extending opposite to an open area of the C-shaped cross-sectional portion and sharing a common branch with said C-shaped cross-sectional portion;

at least one insulating support block comprising a first fixing part engaged with a second fixing part at an assembly interface to constitute a plurality of individual housings to receive each current conductor, said insulating support block extending perpendicularly with respect to a longitudinal direction of the profiled sections;

semi-open recesses formed in one of at least the first and second fixing parts to bound said housings, said recesses having bottoms located in distinct planes extending in a parallel manner along the longitudinal direction of the profiled sections, and separated from one another by a preset transverse pitch, said profiled sections being staggered at regular intervals with respect to the assembly interface to form a stepped structure; and assembly means for tightening the first and second fixing parts against one another at the assembly interface, wherein said C-shaped cross-sectional portion comprises a flat contact face to which a connecting conductor is connected outside the insulating support block, connection being made in a predetermined longitudinal position by means of a connecting device having a bolt and nut accessible from outside, each contact face being arranged in a plane parallel to a direction of the transverse pitch, and staggered transversely by the transverse pitch, and along the assembly interface by said intervals, and wherein the width of each recess, measured from the contact face in the direction of the assembly interface, corresponds to the width of the current conductors.

* * * * *